Figure 1:
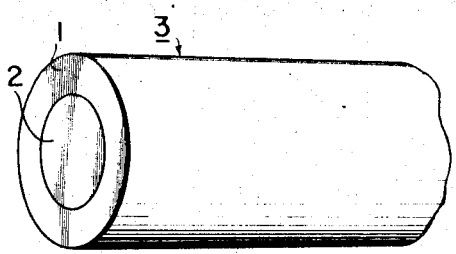
Figure 2:
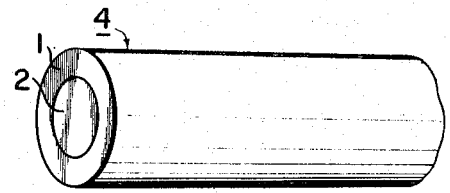

United States Patent [19]

Kono et al.

[11] 3,778,894
[45] Dec. 18, 1973

[54] PROCESS FOR MAKING A V$_3$GA SUPERCONDUCTIVE COMPOSITE STRUCTURE

[75] Inventors: Akiro Kono, Tokyo; Yoshiharu Nozawa, Yokohama, both of Japan

[73] Assignees: Ulvac Corporation, Kanagawa-ken; The Research Development Corporation of Japan, Tokyo, Japan

[22] Filed: Dec. 6, 1971

[21] Appl. No.: 205,057

[30] Foreign Application Priority Data
Dec. 15, 1970 Japan.............................. 45/111127

[52] U.S. Cl.................... 29/599, 29/199, 148/127, 174/126 CP, 174/DIG. 6, 335/216
[51] Int. Cl........................................... H01v 11/00
[58] Field of Search................... 29/599, 194, 199; 174/126 CP, DIG. 6; 335/216; 148/127

[56] References Cited
UNITED STATES PATENTS
3,574,573  4/1971  Tachikawa...................... 29/194 X
3,652,967  3/1972  Tanaka et al.................. 174/DIG. 6
3,218,693  11/1965  Allen et al....................... 29/599 X
3,625,662  12/1971  Roberts et al. .................. 29/599 X FOREIGN PATENTS OR APPLICATIONS
1,039,316  8/1966  Great Britain........................ 29/599

Primary Examiner—Charles W. Lanham
Assistant Examiner—D. C. Reiley, III
Attorney—P. D. Golrick

[57] ABSTRACT

A process for making a V$_3$Ga superconductive composite structure wherein a composite structure is formed by sheathing one or more elements, of vanadium metal or vanadium base alloy containing one or more of Ti, Zr or Hf in an amount of less than 10 atom %, with a pure metal selected from the group consisting of Cu, Au and Ag, said composite structure is subjected to a plastic working, the resulting composite structure is coated with gallium, and said gallium-coated composite structure is heat treated to diffuse the gallium into said coated layers and simultaneously to produce V$_3$Ga in a boundary zone.

9 Claims, 14 Drawing Figures

PATENTED DEC 18 1973 3,778,894

SHEET 2 OF 3

PROCESS FOR MAKING A V GA SUPERCONDUCTIVE COMPOSITE STRUCTURE

This invention relates to a process for making a superconductive $V_3Ga$ composite structure.

The intermetallic compound $V_3Ga$ has an excellent superconductivity as evidenced by high values of a critical magnetic field and critical current, but it is very brittle, and it is practically impossible to form and to use it as a long superconductive element comprising $V_3Ga$ only, and particularly to wind it into a coil.

To overcome these disadvantages, a method has been tried wherein vanadium metal is first formed into a long element having a desired sectional shape and dimension, the resulting element is converted to a long composite structure by coating the surface of the vanadium with gallium or gallium base alloy by a method such as immersing said element into a molten gallium metal or gallium base alloy, and finally said composite structure is subjected to a heat treatment to cause diffusion and/or chemical reaction to form $V_3Ga$ on the surface area of said vanadium metal. The attempt has tentatively succeeded, and it has been found that such a long superconductive element can be obtained with $V_3Ga$ formed on the surface of the vanadium and with the reaction residues further adhered on the outer surface thereof; and that therein the vanadium and/or the reaction residues serve as a supporting structure for reinforcing the $V_3Ga$ so as not to deteriorate the superconductivity of said $V_3Ga$.

The $V_3Ga$ for use in a superconductive magnet is made as a tape-shaped long structure in a sandwich arrangement centering about a thin vanadium plate, but a coil wound from such a tape cannot attain high homogeneity of a magnetic field, rendering it unsuitable, for example, for use in a magnet for nuclear magnetic resonance work.

This shortcoming will be overcome by providing a long wire structure able to be wound to a superconductive coil. The reason will approximately be as follows: if a long wire structure is wound to a coil, the homogeneity of the magnetic field to be formed will be raised by regulating the distribution of the thickness of the coil.

For these reasons, a process for making a long superconductive $V_3Ga$ wire structure which can be wound to a coil has recently been developed. (The spring presentation in 1970 of the Society of Metal Science in Japan). The process is summarized as follow: A bar block of Cu-Ga alloy which has a relatively large cross-section and a relatively short length is longitudinally perforated, by mechanical working, with one or more elongated openings, vanadium bars having an outer diameter substantially equal to or slightly smaller than the inner diameter of the openings are inserted therein, the thus obtained rod-like composite block element comprising the alloy bar block and vanadium bar or bars is formed to a fine composite filament of a desired fineness in which the vanadium and the Cu-Ga alloy closely adhere, by plastic working such as swaging and an intermediate heat treatment or wire drawing, and the resulting composite filament is heat treated for example at about 700°C. The composite filament is formed, due to said heat treatment, to a V/$V_3$Ga/CuGa alloy structured filament in which the $V_3Ga$ layer is produced on the surface region of the vanadium, i.e. the boundary zone; and, as the filament has an excellent superconductivity and can be wound to coil, it is a very superior superconductive material.

However, the aforesaid process for making a composite filament of a V/$V_3$Ga/CuGa alloy structure is required to use a Cu-Ga alloy having an inferior plastic workability, and furthermore, because the plastic workability is remarkably different, there are may disadvantages as follows:

1. the intermediate heat treatment and the plastic working must be carried out carefully and slowly and be repeated several times to form a composite filament of a desired section, 2. the operation becomes therefore troublesome and difficult, failures in the operation often occur, and thus the working expenses, working equipment and the time required for working become quite large, and 3. despite the fact that the composite filament structure can exhibit excellent properties if formed to a multicore filament, the working is dfficult as above stated, so that it can not be formed to a multicore filament.

The principal object of the present invention is to eliminate many disadvantages of the above-mentioned process for making composite filament structure.

The present invention provides a process for making a superconductive $V_3Ga$ composite structure which comprises forming a composite structure by sheathing one or more of elements consisting of vanadium or vanadium base alloy, such alloy containing at least one of titanium, zirconium, and hafnium in an amount of less than 10 atom %, with a pure metal having a preferable workability and high heat conductivity, subjecting said composite structure to a plastic working, such as forging, swaging, rolling and/or drawing, to make the element and sheathing closely adhere in the boundary zone, coating gallium on said composite structure after the plastic working, and heat treating the gallium-coated composite structure to diffuse the gallium into said sheathing layer or layers and simultaneously to produce $V_3Ga$ in said boundary zone.

Figure 3:
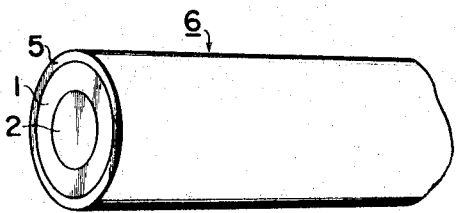
Figure 4:
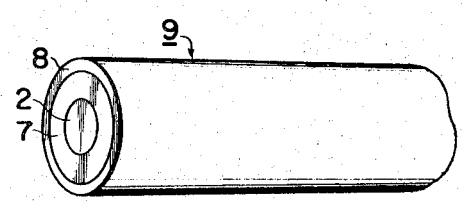
Figure 5:
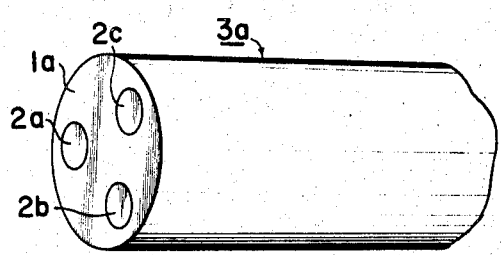
Figure 6:
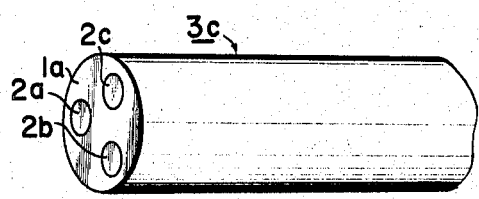
Figure 7:
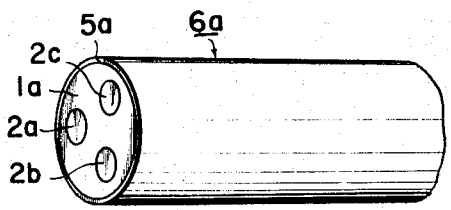
Figure 8:
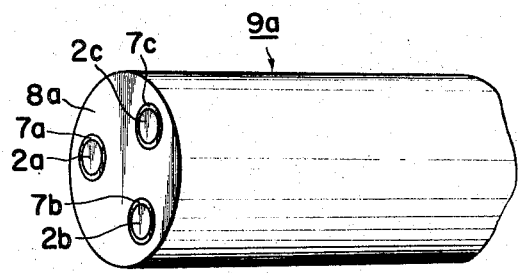
Figure 9:
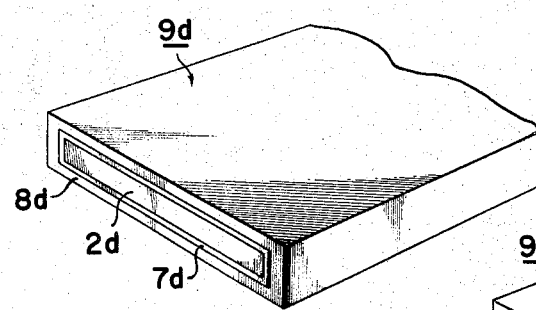
Figure 10:
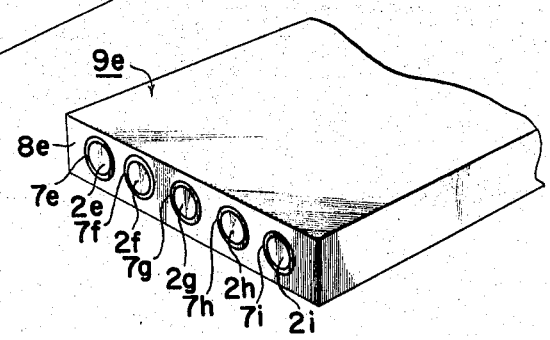
Figure 11:
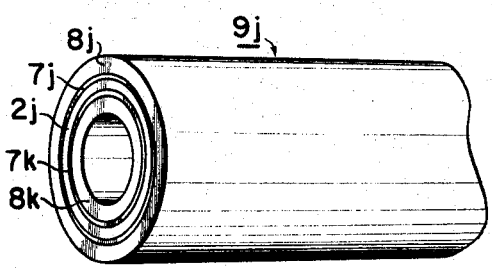
Figure 12:
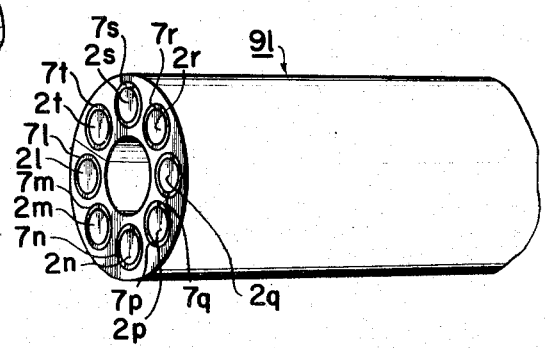
Figure 13:
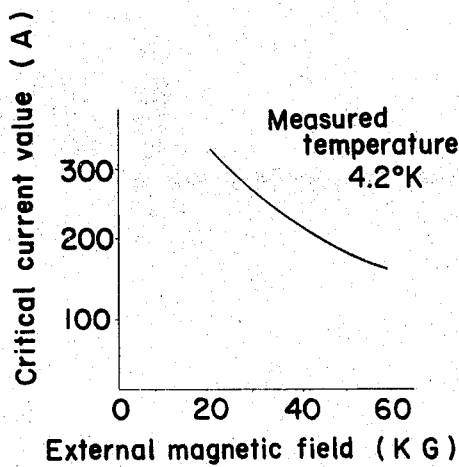
Figure 14:
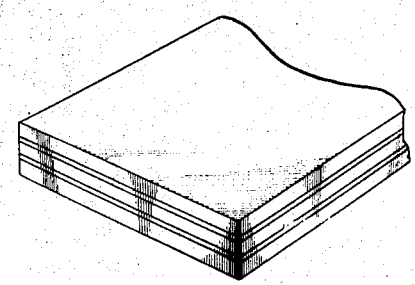

Typical examples of the invention will now be more particularly described with reference to the accompanying diagramatic drawings, in which:

FIGS. 1–4 are perspective views diagrammatically showing the basic structures at successive steps for superconductive products being made according to any example of the process of the invention, FIGS. 5–8 are views corresponding to FIGS. 1–4, showing successive steps for another example of the products obtainable, FIGS. 9–11 are views corresponding to FIG. 4, showing further examples of the products, FIG. 12 shows a hollow cylindrical superconductive material which is made from the tape-shaped finished product shown in FIG. 10, FIG. 13 is a graph indicating the superconductive properties of the composite structures made according to the Examples of the invention, and FIG. 14 is a perspective view showing another example of the superconductive structure according to the invention.

In the Example shown in FIGS. 1–4, a tubular body 1 of copper, having a relatively short length and a relatively large cross sectional area as shown in FIG. 1, first has inserted or enclosed therein a vanadium bar 2 with or without a copper coating and having an outer diameter substantially equal to the inner diameter of the body; to form a composite element 3; or a vanadium bar body 2 is thickly coated with a copper coating layer 1 to form the composite element 3. The resulting element is then finished to a composite filament 4 consisting of a copper-sheathed vanadium (see FIG. 2) by carrying out such a plastic working as swaging, wire drawing or rolling without an intermediate heat treatment or with repeated heat treatments. Thereafter, the composite filament 4 is immersed in a molten gallium bath to coat a gallium layer 5 around the copper layer 1 as shown in FIG. 3. The thus obtained gallium-coated composite filament 6 is heat treated, for example, at 700°C for several hours, and the gallium constituting the coating 5 penetrates by diffusion through the copper layer, and forms a $V_3Ga$ layer 7 on the interface of the vanadium portion 2, being present in the inner part by virtue of a diffusion and/or chemical reaction, as shown in FIG. 4. In this case the copper (layer 1 in FIG. 3) through which the gallium is diffused is converted into the outer layer 8 of FIG. 4 consisting mainly of Cu-Ga alloy. As stated above, a superconductive filamentary material 9 is achieved which has substantially the same composition as the superconductive material obtained according to the aforesaid recently developed process.

EXAMPLE 1 - A

An example of the result obtained by carrying out the process stated above is described as follows:

1. Dimension of the tublar copper body shown in FIG. 1: 40 mm in outer diameter, 30 mm in inner diameter and 200 mm in length.
2. Dimension of the vanadium bar 2 shown in FIG. 1: 28 mm in outer diameter and 200 mm in length.
3. Intermediate heat treatment at the time of the plastic working: None.
4. Dimension of the copper sheathing or coating 1 in the composite filament 4 shown in FIG. 2: 0.35 mm in outer diameter, 0.33 mm in inner diameter and 1,000 M in length.
5. Method for coating the gallium 5 and its thickness: By immersion, and about $6\mu$ in thickness.
6. Formed $V_3Ga$ layer 7 shown in FIG. 4: About $6\mu$ in thickness.
7. Characteristic of finished superconductive material: Critical current value of as high as 50 A at 50 kilo gauss.

According to Example 1, the mechanical working of the copper is easy, and if circumstances require, a tubular copper body on the market can also be utilized. Furthermore, not only the plastic working of copper is easy, but also there is no remarkable difference between the plastic workability of copper and vanadium, so that the composite element can be formed to a composite filament by means of a simple and inexpensive plastic working usually without an intermediate heat treatment, and if it is required, a few repetitions are sufficient. Yet, the operation by which the composite filament is formed to a superconductive material is also effected merely by coating gallium thereon and heat treating it.

EXAMPLE 1 - B

A vanadium bar 35 mm in outer diameter and 200 mm in length is inserted into a copper tube of 40 mm in outer diameter, 36 mm in inner diameter and 200 mm in length, and drawn to a filament of 0.35 mm by means of a grooved cold roll and wire drawing without an intermediate heat treatment. The diameter of the core vanadium is 0.31 mm. After washing, the resulting filament is continuously immersed into a molten gallium bath at about 100°C to coat gallium of about $6\mu$ on the surface. The coated filament material is continuously heated in vacuum at about 500°C to form a Cu-Ga alloy by reacting the coated gallium with the copper. The filament material is wound on a bobbin, and heated at temperatures between 600° and 700°C. The best superconductivity can be obtained when it is heat treated at about 700°C for one hour and at 625°C for about 20 hours. The critical current value of the filament material which is heat treated at 650°C for 3 hours is 30 A at 60 kilogauss. Frequencies of gallium platings and the heat treatments at a low temperature which are carried out subsequently thereto depend on the amount of copper present together with the vanadium, and it is most desirable that the proportion of the gallium, in the Cu-Ga alloy formed by the heat treatment carried out subsequently to the gallium plating, be about 20–30%. If the proportion of the gallium in the Cu-Ga alloy should be lowered, the time required for the heat treatment becomes extremely long.

EXAMPLE 2

A vanadium bar of 35 mm diameter and containing 0.5 atom % zirconium is inserted into a copper pipe having the same shape as in Example 1-B, and after being processed to a bar 5 mm square by rolling it with a cold grooved roll, it is rolled to a tape. The tape is reduced during the rolling operation with a slitter to roll it to tape 6 mm in width and $80\mu$ in thickness. The tape is subjected to a wet plating by using a 15% NaOH solution to produce a gallium coating of about $5\mu$. Subsequently, the same heat treatment as in Example 1 is effected, and upon examination the superconductivity of the product (see FIG. 9) is very superior as in FIG. 13.

Other Examples will be described as follows:

A modification in method and product, as in Example 3 explained by FIGS. 5–8, is practically the same as Example 1, excepting that a plurality of vanadium wires is used (three wires 2a, 2b, 2c are shown in the drawings), so that the portions corresponding to those in Example 1 are indicated by the same numerals with suitable suffixed letters, and detailed explanation will be omitted, except for the following Example 3.

EXAMPLE 3

In a copper bar 1a of 36 mm outer diameter and 200 mm length having, 18 openings of 4.3 mm diameter longitudinally perforated therethrough, vanadium (such as 2a, 2b, etc.) of 4.0 mm in diameter are inserted; the resulting structure is rolled to about 5 mm square by means of a cold grooved roll; and after being subjected to an intermediate heat treatment at 600°C, it is cold drawn to a filament of 0.35 mm. In the ultimate product, the critical current value in an external magnetic field of 60 kilogauss is 48 A.

Other modifications are shown in FIGS. 9-12.

FIGS. 9 and 10 show tape-like finished products in which respectively the vanadium has a tape shape and in which the vanadium consists of a plurality of parallel filaments. FIGS. 11 and 12 show hollow superconductive materials in which respectively the vanadium has a tubular shape, and in which a tape-shaped finished product similar to that shown in FIG. 10 is bent to cylindrical form and then welded,. As these drawings correspond to the stage of FIG. 4, the reference numerals in these drawings are the same as those in FIG. 4 with suffixed letters, and explanation is omitted. Further, FIG. 14 shows an embodiment having to a sandwich shape, and filament material having the superconductive property equal to that as above-mentioned can be obtained by cutting this stock material longitudinally to form tapes.

The invention is not limited to the Examples as above-mentioned, and pure metals which generally have a low superconductivity or none and an excellent plastic workability, such as for example Ag (silver), Au (gold) etc. can widely be adopted in place of copper. It may be noted, incidentally, that the amount of gallium coated with these pure metals, particularly with copper, is desirably from about 5 to about 50 atom % based on that of the copper layer in case of the shape shown in FIG. 1. If the amount of the gallium should be as low as less than 5 atom %, $V_3Ga$ to a necessary degree is produced with difficulty; and on the contrary, if it should be as high as more than 50 atom %, the coated layer 8 shown in FIG. 4 becomes brittle, and obstacles occur in coiling. Further, when a vanadium alloy, other than vanadium alloy with less than about 10 atom % of Ti, Zr or Hf, is used in place of vanadium, the plastic workability, that is; ductility so deteriorates that it is difficult to form it to a filament structure, and a content of undesirable V-Ga intermetallic compounds other than the $V_3Ga$ becomes larger.

Moreover, the superconductive composite materials according to the Example described relative to and shown in FIGS. 5–8 are not inferior as compared with those of the Example shown in FIGS. 1–4. Also, with the Example shown in FIGS. 9–11, there are the advantages that the fabrication is easy, coiling is simple, and the coiled materials serve to produce a magnetic field of a high homogeneity Thus, Examples as above-mentioned all overcome or reduce the conventional process and product disadvantages.

Furthermore, the invention can be utilized to form a composite structure other than a composite filament structure, such as for example a tape-shaped or hollow composite structure, and the superconductive materials according to the process of this invention are superior to conventional $V_3Ga$ superconductive materials in many points.

A cable or coil for transportation of large power or a memory element may be made using a superconductive structure fabricated according to the process above described.

What we claim is:

1. A process for making a superconductive $V_3Ga$ composite structure which comprises:
   covering an element consisting of vanadium metal or vanadium base alloy with a coextensive layer of a pure metal thereby forming a composite structure, said pure metal having a good plastic workability and a high heat conductivity and being selected from the group consisting of copper, silver and gold;
   subjecting said composite structure to a plastic metalworking operation in order to reduce its cross-section thereby causing said element and said layer to adhere closely at the boundary zone therebetween;
   coating gallium onto the outside surface of said layer of the worked composite structure, said pure metal layer separating said gallium from said element; and
   heat treating the gallium-coated composite structure to diffuse the gallium into and through said layer thereby producing $V_3Ga$ at said boundary zone.

2. A process as claimed in claim 1, wherein said plastic working is carried out by forging, swaging, rolling or drawing.

3. A process as claimed in claim 1, wherein coating of gallium is carried out by dipping or plating.

4. A process as claimed in claim 1, wherein:
   the gallium coat is applied by immersion of the worked composite structure in liquid gallium.

5. A process as claimed in claim 1, wherein said vanadium base alloy contains at least one of Ti, Zr, Hf in an amount of less than 10 atom %.

6. A process as described in claim 1, wherein:
   said plastic working is carried out by rolling.

7. A process as described in claim 1, wherein:
   said plastic working is carried out by drawing.

8. A process as described in claim 1, wherein:
   said plastic working is carried out by swaging.

9. A process as described in claim 1, wherein:
   a plurality of vanadium or vanadium base alloy elements is sheathed in a single body of copper as said pure metal to form the said composite body before said working.

* * * * *